J. W. DOWLER.
HAND-CULTIVATOR.
No. 187,222. Patented Feb. 13, 1877.
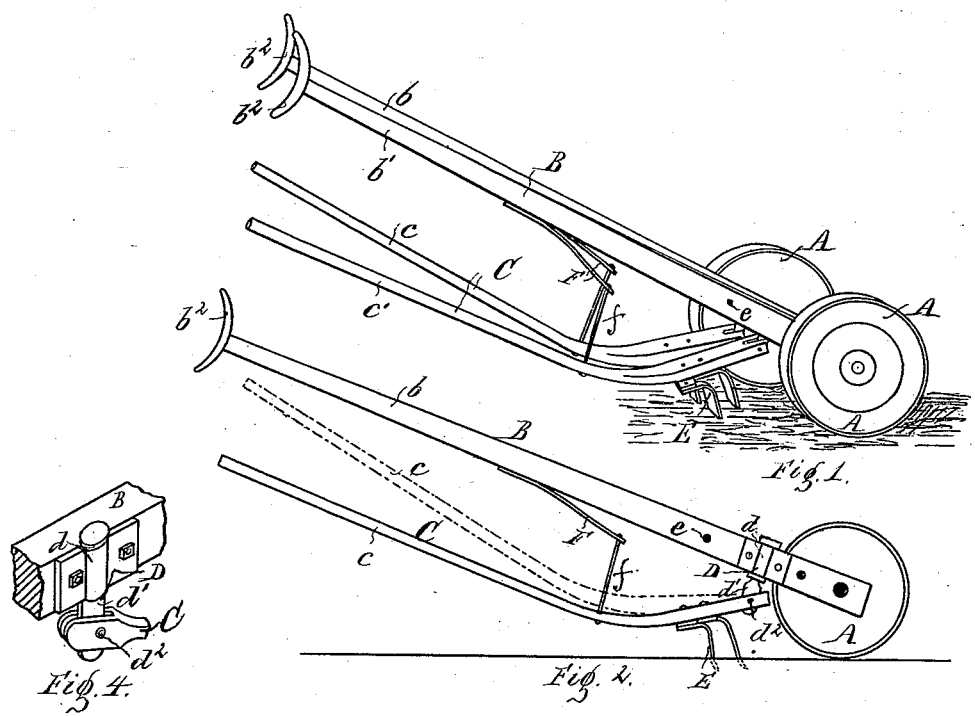
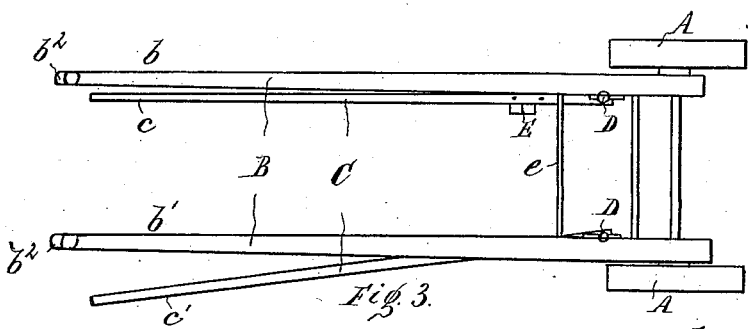
Witnesses:
J. W. Heithel
Cha. F. Meisner
Inventor:
Joseph W. Dowler
per Herthel & Co.
Atty's

UNITED STATES PATENT OFFICE.

JOSEPH W. DOWLER, OF ST. LOUIS, MISSOURI.

IMPROVEMENT IN HAND-CULTIVATORS.

Specification forming part of Letters Patent No. 187,222, dated February 13, 1877; application filed May 11, 1876.

*To all whom it may concern:*

Be it known that I, JOSEPH W. DOWLER, of St. Louis, in the county of St. Louis and State of Missouri, have invented an Improved Cultivator, of which the following is a specification:

This invention relates to hand-cultivators, used more specially for cultivating smaller growth of vegetables, fruits, plants, &c.

The nature of this invention consists in the novel combination of the parts to achieve the advantages, all of which will now more fully appear.

Of the drawing, Figure 1 is a perspective view of my improved cultivator. Fig. 2 is a sectional side elevation, the dotted lines showing adjustability of the plows vertically. Fig. 3 is a top plan, showing the adjustability of the plows laterally. Fig. 4 is enlarged detail, showing bolt, which secures the plow-beams to the shoulder-frame.

I construct what I term a shoulder-frame, which is supported on wheels.

A are the wheels, made to turn in the shoulder-frame B. It is this frame B that the gardener pushes and forces along by the use of his shoulders, in order to operate the plows. This frame B consists of the parallel beams $b$ $b^1$, (see Figs. 1 and 2,) having at their extremities the crutch or shoulder parts $b^2$. These latter parts are curved to fit the shoulders of the operator, and to enable same to have a firm push-hold, to force the cultivator along in front of his person. The operator can thus walk more erect, and utilize the weight and strength of his body to greater advantage in pushing the cultivator, his hands being entirely free for the better controlling of the action of the plows.

The shoulder-frame and truck carries the plow attachment C. This consists of plow-beams $c$ $c'$, one end of each thereof extending within the operator's reach, the other end of each beam being secured to the frame B, as follows: I construct a bolt, D, so as to have its upper half at $d$ rounded, and its lower half at $d^1$ flattened in a vertical direction. (See Figs. 2, 3, 4.) The rounding of the bolt at $d$ is to journal the same to turn in a suitable bearing, (see Fig. 4,) the object of the flattened part $d^1$ of the bolt being to pivot to it the plow-beams, so that each of these can be operated vertically; hence the ends of the plow-beams can be slotted and fitted to have the flattened end of the bolt to pass through the slot, and pivoted by a pin, $d^2$, as shown in Figs. 2, 4. As therefore the hands of the operator take hold of the plow-beams, the action of the plows is completely in the power of the gardener, so as to suit the nature of the soil and plants; and hence with great dispatch, and in the most perfect manner, the plows can be made to stir the soil, kill the weeds, clear the rows, keep the ground loose, and otherwise perform the work of cultivation.

E represents one or more ordinary plows, simply bolted to the plow-beams, as usual. $e$ is a brace, to secure the two parts of the shoulder-frame more firmly. F are springs, one end of which is secured to each of the beams of the shoulder-frame, the loose end, by cord attachment $f$, being secured to each plow-beam; the object of the springs and cords being to raise the plows out of the ground when not used.

By gaging the depth of the plows, the springs are drawn downward, and in this condition the tension of the springs, (when plow-beams are let go,) by automatically raising said plow-beams at same time raises the plows.

What I claim is—

The shoulder-frame B, consisting of the beams $b$ $b^1$, having crutch parts $b^2$, truck A, bolts D, springs F, plow attachment C, consisting of plow-beams $c$ $c'$, plows E, all said parts being constructed and combined, as shown and described, to operate in the manner and for the purposes set forth.

In testimony of said invention I have hereunto set my hand.

JOSEPH W. DOWLER.

Witnesses:
WILLIAM M. HERTHEL,
CHAS. F. MEISNER.